United States Patent

Ohtake et al.

[11] Patent Number: 5,875,359
[45] Date of Patent: Feb. 23, 1999

[54] FOCUSING METHOD AND APPARATUS FOR CAMERA

[75] Inventors: Motoyuki Ohtake, Kawasaki; Koichi Ohshita, Tokyo, both of Japan

[73] Assignee: Nikon Corporation, Tokyo, Japan

[21] Appl. No.: 820,752

[22] Filed: Mar. 19, 1997

[30] Foreign Application Priority Data

Mar. 21, 1996 [JP] Japan .................................. 8-091985

[51] Int. Cl.⁶ .................................................. G03B 13/10
[52] U.S. Cl. .............................. 396/80; 396/84; 396/148; 396/379; 396/382
[58] Field of Search .............................. 396/79–84, 148, 396/149, 373, 378, 379, 382

[56] References Cited

U.S. PATENT DOCUMENTS

| | | | |
|---|---|---|---|
| 4,072,971 | 2/1978 | Kuboshima | 396/84 |
| 5,496,994 | 3/1996 | Ohtake | 250/201.6 |
| 5,576,779 | 11/1996 | Ikemori et al. | 396/79 |
| 5,655,159 | 8/1997 | Nakayama et al. | 396/84 |

FOREIGN PATENT DOCUMENTS

| | | |
|---|---|---|
| 61-26029A | 2/1986 | Japan . |
| 61-259210 | 11/1986 | Japan . |
| 2-203311A | 8/1990 | Japan . |
| 3-41425A | 2/1991 | Japan . |
| 07005527A | 1/1995 | Japan . |

*Primary Examiner*—W. B. Perkey
*Attorney, Agent, or Firm*—Michael N. Meller

[57] ABSTRACT

In a camera comprising a phototaking lens system and a viewfinder lens system having a different optical axis from that of the phototaking lens system, the camera comprises a drive means, for simultaneously zooming the phototaking lens system and the viewfinder lens system, which simultaneously shifts at least one of the lens groups of the phototaking lens system and at least one of the lens groups of the viewfinder lens system. The drive means simultaneously focuses the phototaking lens system and the viewfinder lens system on an object by simultaneously shifting at least one of the lens groups of the phototaking lens system and at least one of the lens groups of the viewfinder lens system based on the position data of the object.

11 Claims, 10 Drawing Sheets

FOCUSING METHOD AND APPARATUS FOR CAMERA

FIELD OF THE INVENTION

The present invention relates to a camera focusing method and apparatus. More specifically, the present invention relates to the lens-shutter type camera with a viewfinder lens system wherein the viewfinder lens system and phototaking lens system of the camera have separate optical axes and are able to focus on an object at close range.

BACKGROUND OF THE INVENTION

In a conventional lens-shutter camera, it is common for the optical axis of a phototaking lens system and the optical axis of a viewfinder lens system to be separately positioned at a predetermined distance from each other. In recent years, particularly, cameras with a zoom lens having a high zoom ratio have become more common and cameras of even higher magnification have become available.

Most of the camera lenses used for lens-shutter cameras are basic zoom lenses having a focal length range from about 35 mm to about 100 mm for the 35 mm film format. When the zoom ratio becomes high, the focal length at the maximum telephoto end becomes long. Also, it is common for lens-shutter cameras to have a minimum objective distance of about one (1) meter.

In a viewfinder lens system used for lens-shutter cameras, the field angle of the viewfinder system changes according to the change in the picture angle of a phototaking lens system during zooming. When the zoom ratio of the objective lens system increases, the zoom ratio of the viewfinder system increases. The zoom viewfinder lens systems are classified into a real image type viewfinder lens system and a virtual image type viewfinder lens system. Generally, the real image viewfinder lens system is more suitable for a higher zoom ratio and miniaturization than a virtual image type viewfinder lens system. Consequently, real image type zoom viewfinder lens systems dominate today in cameras having a high zoom ratio.

In a real image type zoom viewfinder lens system, an objective lens has a variable focal length, and a movable lens group of the objective lens moves along the optical axis during zooming. The objective lens system is configured such that it overlaps the image position of the object formed with the view frame position only when an object is in a specific camera state within the basic length such as infinitely far (hereafter referred to as "basic length").

Note that within the zoom range from the minimum magnification state, which is the maximum wide view angle, to the maximum magnification state, which is a maximum narrow view angle, the viewfinder magnification is minimal at the wide-angle end. Nonetheless, if the viewfinder magnification is extremely small, it is difficult for a photographer to visually recognize the object. To resolve this, the real image type zoom viewfinder lens system maintains the level of viewfinder magnification with which a photographer can visually recognize the object even at the wide-angle end.

Generally, as the zoom range of a camera lens increases, the focal length of an object lens at the telephoto end increases positively. Therefore, when an object position changes, the image position of the object formed by an object lens changes largely along the optical axis. This displacement of the object image causes a variation of diopter, in which a photographer is unable to observe the object clearly unless he/she adjusts his/her eyes to the object proactively. That is, in a conventional technology, a viewfinder lens system is hard on a photographer's eyes, wearing out his/her eyes. It is difficult to confirm the object with such a viewfinder lens system.

First, the zooming of a phototaking lens system and of a viewfinder lens system of a camera is described as follows:

Conventionally, in a phototaking lens system, a movable lens group for zooming is rotated by a zoom drive system such as motors along a helicoid or cam formed inside a lens barrel. In this way, the focal length of a phototaking lens system is changed during zooming by shifting a movable lens group in the optical axial direction. Generally, a phototaking lens system performs focusing by shifting a predetermined focus lens group in the optical axial direction according to the object position via a focus drive system which is separate from a zoom drive system.

Also, in a viewfinder lens system, a movable lens group for zooming is rotated by a zoom drive system such as motors along a helicoid or cam formed inside a lens barrel. Zooming is performed by shifting a movable lens group along an optical axial system in the same way. Generally, the zoom drive system for a phototaking lens system and for a viewfinder lens system allows miniaturization and power consumption reduction.

If a manufacturing error is ignored, in a phototaking lens system comprising a zoom lens, the image position for an object positioned at infinite distance state is fundamentally always constant when performing a zooming from the maximum wide-angle state, which is in the shortest focal length state to the maximum telephoto state, which is in the longest focal length state. On the other hand, there is the so-called "step-zoom" system in a variable focal length lens system whose image position to an object is not always constant during zooming but is intermittently constant within a predetermined position state (corresponding to a predetermined focal length state.)

In the camera disclosed in Kokai S61-259210, a phototaking lens system is configured with a step-zoom system, which uses a cam orbit except for a predetermined lens position state for focusing. In other words, using a focus cam as a zoom cam, a predetermined focus lens group is moved in the optical axial direction at a predetermined lens position state by means of a zoom drive system to focus on an object. By omitting a focus drive system for a phototaking lens system of a conventional technology, the focusing mechanism incorporating the principles of the present invention is simplified.

As mentioned before, the same zoom drive system for the phototaking lens system drives the phototaking lens movable lens group and the viewfinder lens system zoom lens group. Therefore, when a phototaking lens system focuses on an object at close range, the movable lens group in the viewfinder lens system is automatically driven. As a result, as the phototaking lens system focuses, the viewfinder lens system is triggered to perform a zooming operation, changing the field range of a viewfinder lens system even when the phototaking lens system does not zoom. This is an unfavorable result.

Japanese Laid-Open Kokai H7-5527 discloses a viewfinder lens system which corrects a variation of diopter caused by the change in an object position, through focusing by shifting the lens group nearest to the object side along an optical axis. However, the viewfinder lens system disclosed in Kokai H7-5527 requires separate drive mechanisms for zooming and focusing, complicating the viewfinder lens system configuration.

SUMMARY OF THE INVENTION

Accordingly, it is an object of the present invention to resolve the aforementioned problems. It is a further object of the present invention to provide a camera with a viewfinder lens system which is able to correct a variation of diopter caused by the change in an object position without complicating the viewfinder lens system configuration.

In order to overcome the above problems, an embodiment of the present invention includes a focusing apparatus for a phototaking lens and a viewfinder of the camera focusing on an object. The camera has a phototaking lens system with a plurality of lens groups arranged along a first optical axis. The camera also has a viewfinder system with a plurality of lens groups arranged along a second optical axis, spaced from the first axis. A measuring device is included for measuring the distance from the camera to provide object position data. Also included is a shifting device for shifting at least one of the lens groups of the phototaking lens system along the first optical axis to focus the phototaking lens system in accordance with the object position data. The shifting device simultaneously shifts at least one of the lens groups of the viewfinder lens system along the second optical axis to focus the viewfinder lens system in accordance with the object position data.

A further embodiment of the present invention includes a camera having a phototaking lens system including a plurality of lens groups and a viewfinder lens system including a plurality of lens groups and having a different optical axis from that of the phototaking lens system. A driving device is included for simultaneously zooming the phototaking lens system and the viewfinder lens system by simultaneously shifting at least one of the lens groups of the phototaking lens system and at least one of the lens groups of the viewfinder lens system. The driving device simultaneously focuses the phototaking lens system and the viewfinder lens system on an object by simultaneously shifting at least one of the lens groups of the phototaking lens system and at least one of the lens groups of the viewfinder lens system based on the position data of the object.

In a further preferred embodiment of the present invention, the camera comprises a first guide means for converting the torque generated by the driving device into the shifting distance of at least one of the lens groups of the phototaking lens system in the optical axial direction, and a second guide means for converting the torque generated by the driving device into the shifting distance of at least one of the lens groups of the viewfinder lens system.

The apparatus incorporating the principles of the present invention forms not only the phototaking lens system with a step-zoom system, but also forms the viewfinder lens system with a step-zoom system. In addition, the picture angle of a camera lens and the field angle of the viewfinder lens system conform in a predetermined lens position state in which an object within a basic focal length is focused. Also, in a predetermined lens position state, in which an object is focused within a basic focal length, the camera incorporating the principles of the present invention is configured such that a phototaking lens system and a viewfinder system focus simultaneously when focused by giving a predetermined driving distance to the focus lens group of the phototaking lens system.

As such, a viewfinder lens system can be focused together with a phototaking lens system. This corrects diopter displacement due to the change in the objective position without complicating the viewfinder configuration.

Especially, driving both the phototaking lens system and the viewfinder lens system by the same drive system in accordance with the principles of the present invention allows both systems to zoom and focus simultaneously, thus simplifying the camera configuration and decreasing power consumption.

BRIEF DESCRIPTION OF THE DRAWINGS

The above and other objects, features, and advantages of the present invention will become more apparent from the following detailed description taken with the accompanying drawings, in which.

DESCRIPTION OF THE PREFERRED EMBODIMENTS

Figure 1:
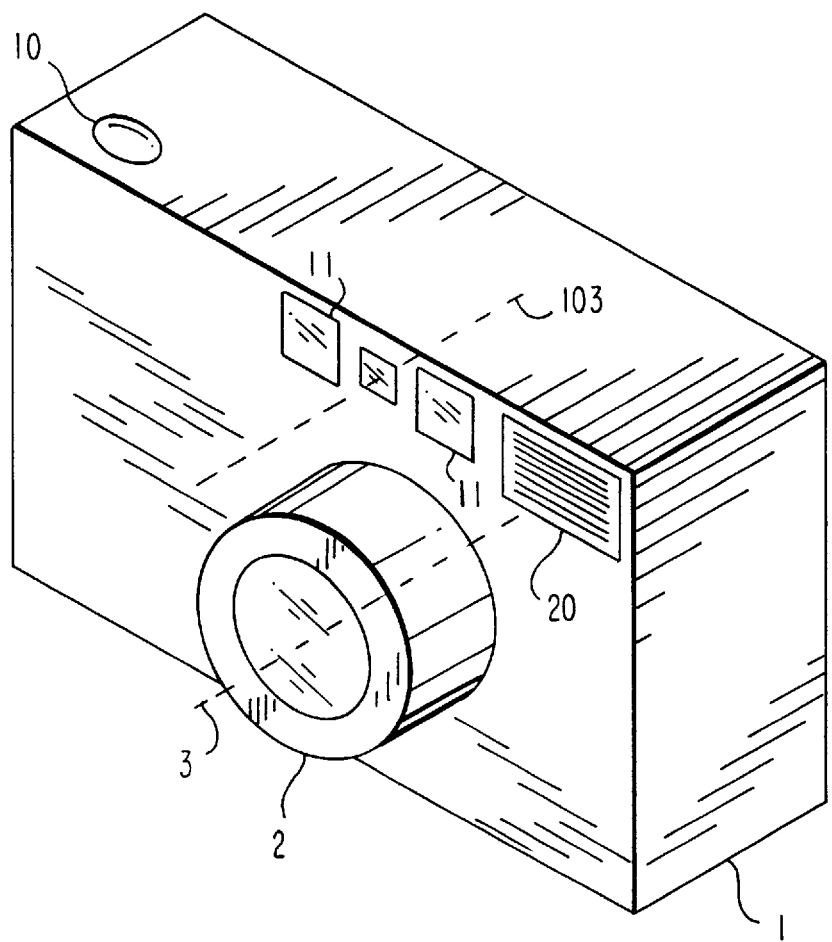
FIG. 1 is a perspective view of a camera including all of the embodiments of the present invention.
Figure 2:
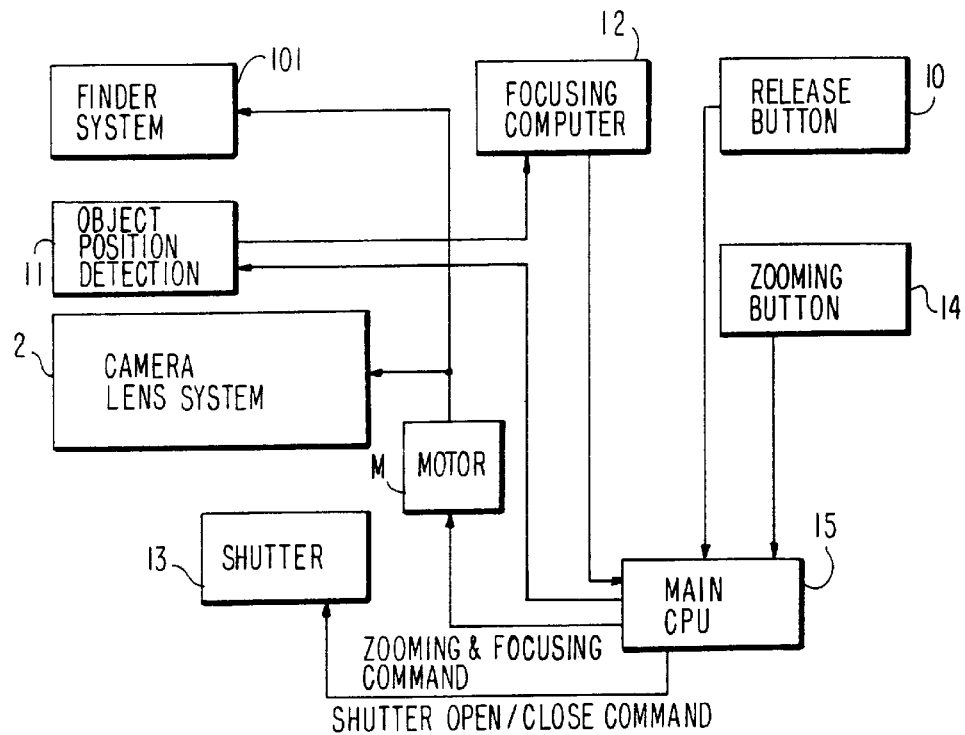
FIG. 2 is a flowchart describing the method steps followed by each of the embodiments of the present invention.
Figure 3:
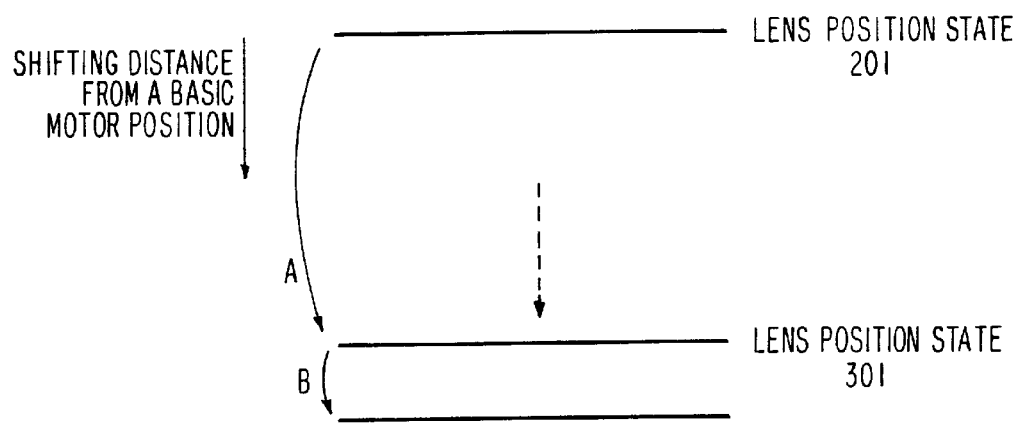
FIG. 3 is a conceptual diagram of the shifting of the lens group during zooming and focusing operations in each of the embodiments.

Referring to the drawings, FIG. 1 is a perspective configuration of a camera related to each of the embodiments. FIG. 2 is a flowchart showing the method steps followed by each of the embodiments defining the basic behavior of the camera. FIG. 3 is a conceptual diagram showing the shifting state of a lens group during zooming and focusing in each of the embodiments.

FIG. 1 illustrates a camera body 1. Included in the camera body 1 is a phototaking lens system 2 having an optical axis 3 and a viewfinder lens system 101 having a separate optical axis 103. In front of the camera body 1 (the surface on the object side) is an object position detecting device 11 and a strobe 20. On top of the camera body 1, a release button 10 is provided.

Referring to FIGS. 2 and 3, the steps for utilizing the camera 1 in each embodiment will be described.

First, if a zooming button 14 is pushed, a zooming command for commanding the zooming drive distance is supplied from a main CPU 15 to a motor M to command the driving distance. According to the zooming command, the motor M drives the phototaking lens system 2 and the viewfinder lens system 101. In this way, as illustrated by an arrow A in FIG. 3, the initially set lens position state 201 moves to another lens position state 301 to perform a zooming operation with the phototaking lens system 2 and viewfinder lens system 101.

Next, when the release button 10 is half pressed, the main CPU 15 supplies a measure distance command to the object position detection device 11 to detect the object position according to the measure distance command. The device 11 outputs a signal corresponding to the resulting object position data for a driving distance computation to a focusing computer 12.

Based on the driving distance computation, the focusing computer 12 transmits the driving distance information needed for focusing on the object to the main CPU 15 based on the object position data obtained from the object position detection device 11. The main computer 15 transmits the focusing command which commands the driving distance needed for focusing to the motor M. According to the focusing command, the motor M drives the phototaking lens system 2 and the viewfinder lens system 101. In this way, as indicated by an arrow B in FIG. 3, the position of a focal lens group is moved a predetermined distance from the lens position state 301 set by zoom ratio changes to focus the phototaking lens system 2 and the viewfinder lens system 101 on an object.

Finally, when the release button 10 is released, the main CPU 15 supplies the shutter open/close command to a shutter 13. According to the shutter open/close command, the shutter 13 opens for exposure.

The above description of the object position detection device has been kept brief in order to avoid unnecessarily complicating the drawing. For a more complete description, one may refer to U.S. Pat. No. 5,496,994, issued Mar. 5, 1996 and assigned to the same assignee as the present application. The contents of this patent are herein incorporated by reference.

Figure 4:
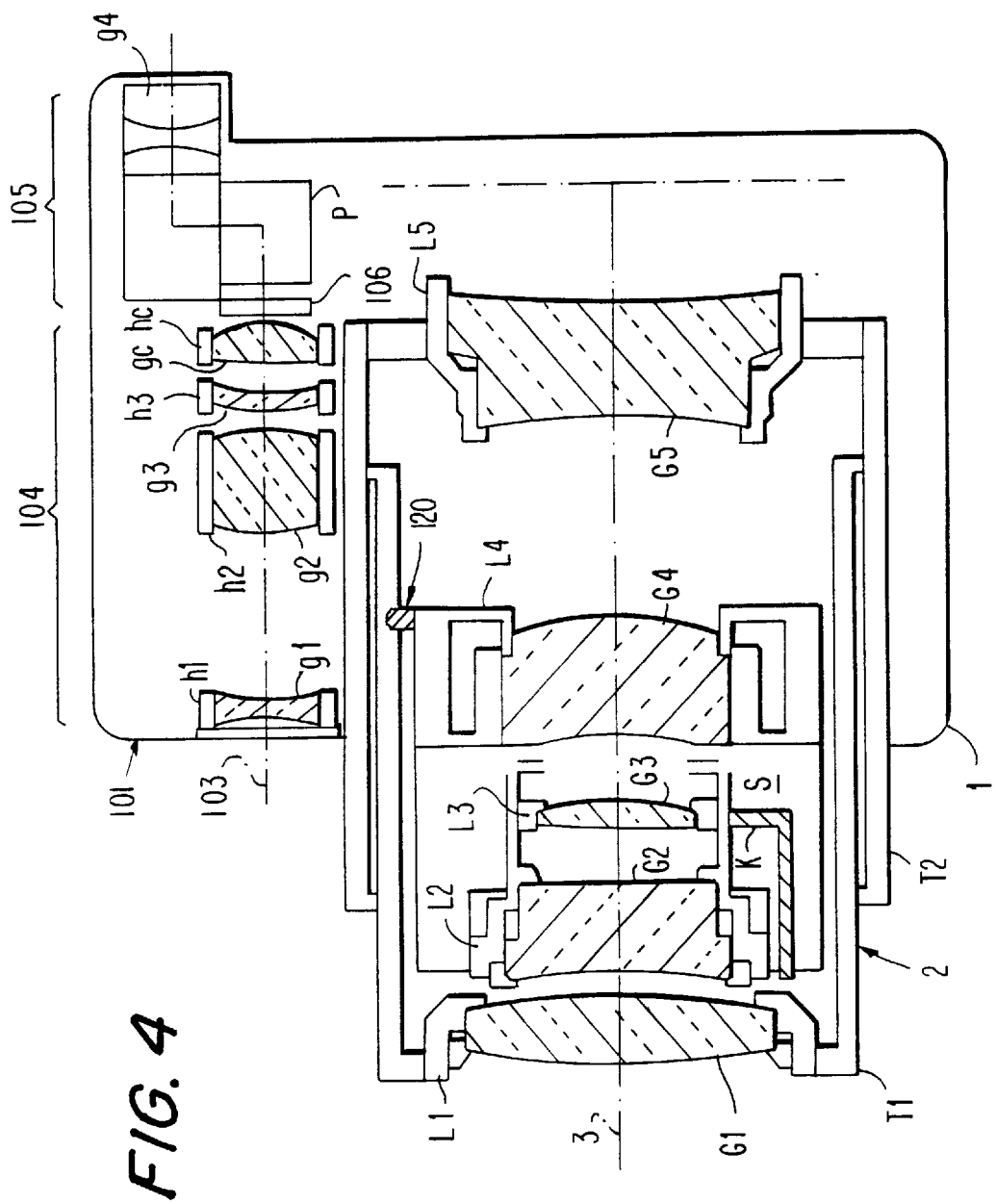
FIG. 4 is a cross-sectional view of the internal configuration of the camera taken along a plane passing through the optical axis 3 of FIG. 1 and the optical axis 103 of FIG. 1 in each of the embodiments of the present invention.
Figure 5:
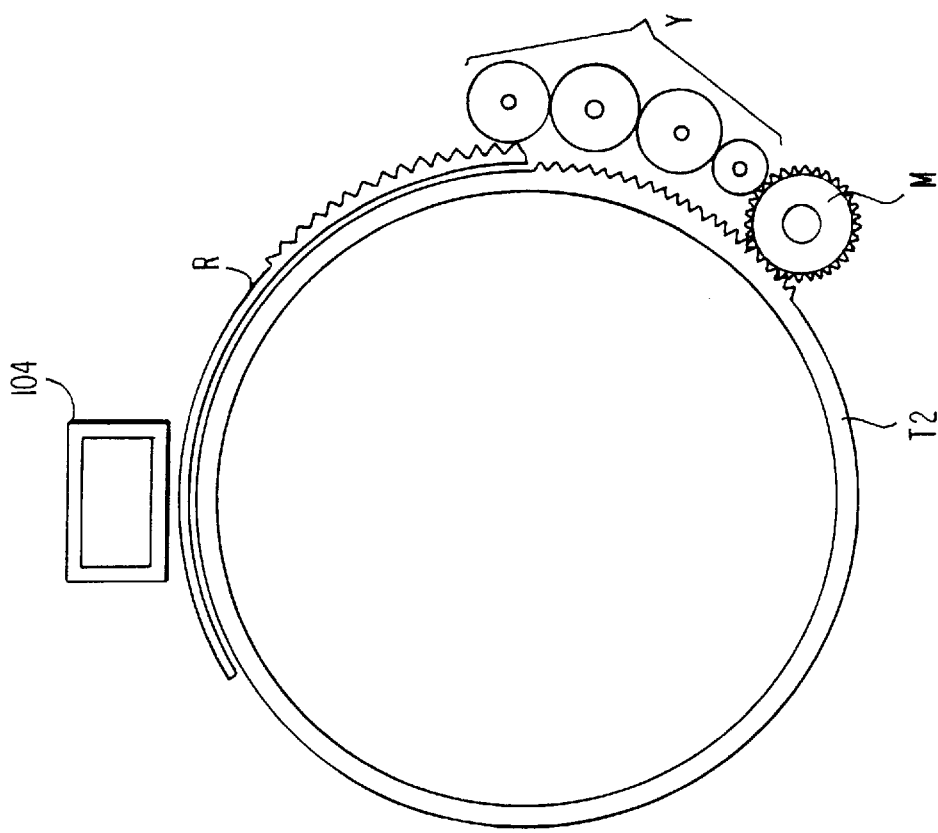
FIG. 5 is a front view, partially in section, of the phototaking lens system taken along a plane perpendicular to the optical axis 3 of FIG. 1.

FIG. 4 is a schematic diagram showing the inside of the camera 1 and various embodiments of the present invention. It is a cross-sectional diagram taken through the optical axis 3 of the phototaking lens system 2 and the optical axis 103 of the viewfinder lens system 101. FIG. 5 is a front view partially in section taken along a plane perpendicular to the optical axis 3 of the phototaking lens system.

As illustrated in FIG. 4, the phototaking lens 2 is a variable focal length lens comprising, in order from the object side, a first lens group G1 having a positive refractive power, a second lens group G2 having a negative refractive power, a third lens group G3 having a positive refractive power, a fourth lens group G4 having a positive refractive power, and a fifth lens group G5 having a negative refractive power. Each of the first lens group G1 through the fifth lens group G5 are held by lens barrels L1 through L5, respectively. Lens barrels L2 and L4 are fixed onto a shutter unit S. The lens barrel L3 is held inside the lens L2 via a helicoid formed on the outer circumference such that during zooming drive lever K rotates around the optical axis 3 to drive the lens barrel L3 in the optical axial direction with respect to the shutter unit S. The drive lever K is rotated based on an electrical signal sent to a stepping motor (not illustrated) in the shutter unit S to rotate the third lens group G3 around the optical axis 3. Therefore, the third lens group G3 moves via the helicoid, serving as a guide means, along the optical axis 3 rotating around the optical axis 3.

The lens barrel L1 is directly fixed onto the first lens cylinder T1. The first lens cylinder T1 is mounted onto the second lens cylinder T2 via another helicoid serving as a guide means. As illustrated in FIG. 5, when the motor M rotates the second lens cylinder T2, the first lens cylinder T1 and, subsequently, the lens barrel L1, and the first lens group G1 move along the optical axis 3.

The shutter unit S and the lens barrel L5 are held inside the second lens cylinder T2 via a follower pin (not illustrated) formed on the outer circumference such follower is similar to the guide or follower pin 120 shown in FIG. 4 on lens barrel L4. When the motor M rotates the second lens cylinder T2, the shutter unit S and the lens barrel L5 are guided along a cam serving as a guide means formed in the second lens cylinder T2 in the optical axis direction. In other words, when the motor M rotates the second lens cylinder T2, the second lens group G2 and the fourth lens group G4 integrally move along the optical axis 3, and the fifth lens group G5 also moves along the optical axis 3.

Also as illustrated in FIG. 4, the viewfinder lens system 101 comprises an objective lens system 104, a field frame 106, and an eyepiece system 105. The objective lens system 104 comprises, in order from the object, lens groups g1, g2, g3, and a condenser lens gc. Note that each of the lens groups g1 through gc constituting the objective lens system 104 are held in a lens barrel via holders h1 through hc, respectively. Also, the eyepiece system 105 comprises a prism P and an eyepiece g4.

As illustrated in FIG. 5, when zooming, the rotary driving force generated by the motor M is transmitted to a zooming lever R via a planetary gear Y. In this way, among the lens groups g1 through gc, a zooming lens group is driven along the cam, serving as a guide means formed on the zooming lever R in the optical axis direction via a guide pin (not illustrated, but similar to pin 120 of FIG. 4) formed under each of the lens holders. In this way, the focal distance for the objective lens system 104 of the viewfinder lens system 101 is varied and so is the field.

In a conventional camera, it is common that the same drive system drives a phototaking lens system and a viewfinder lens system such that each of the zooming lens groups of the phototaking lens system and the viewfinder lens system moves along the optical axis. In the illustrated embodiment of the present invention also, the same motor M, the same drive system, drives the zooming lens group of the phototaking lens system 2 (except the third lens group G3) and the zooming lens group of the viewfinder lens system 101 in the optical axial direction.

EMBODIMENT 1

Figure 6:
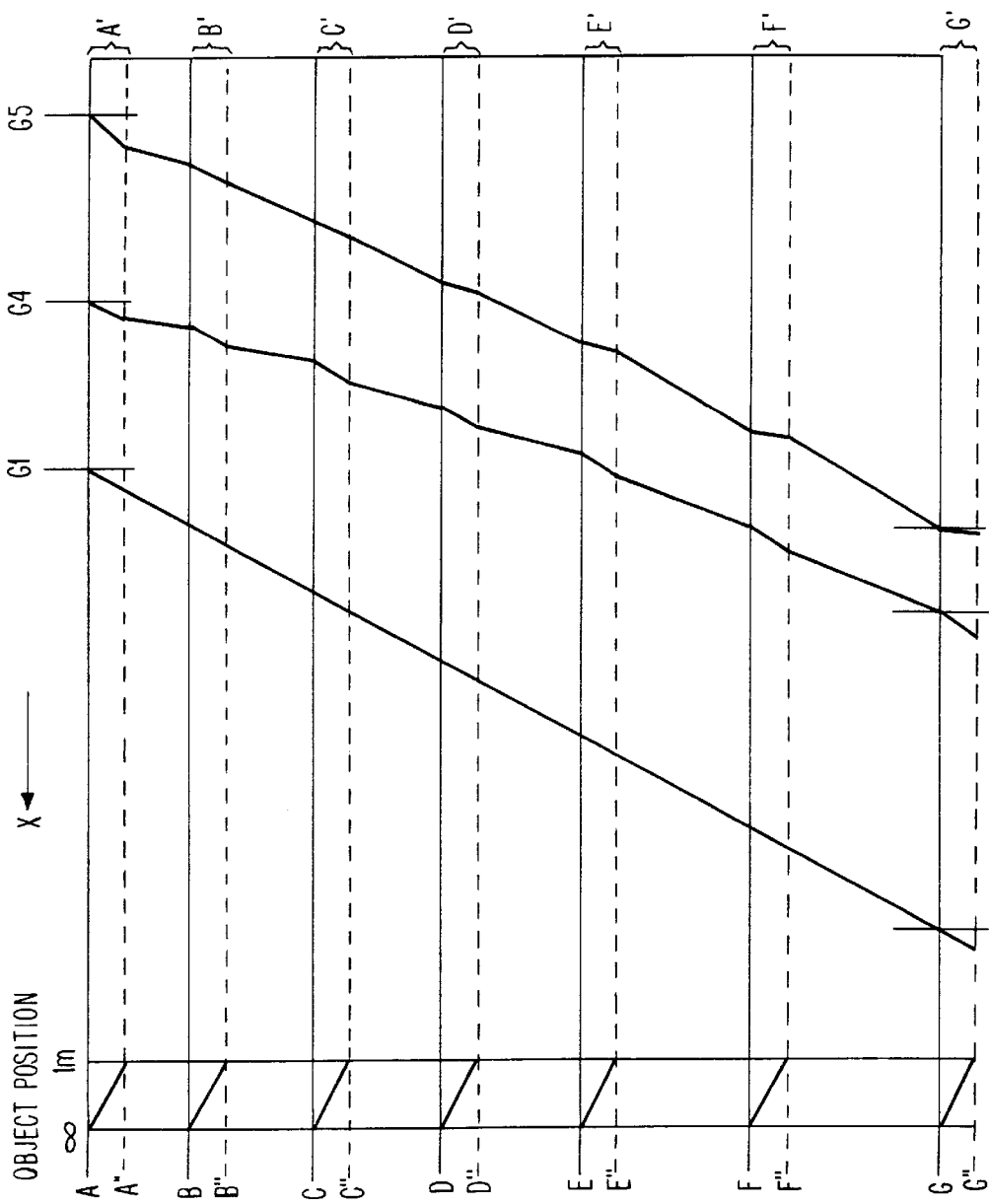
FIG. 6 is a zooming locus for Embodiment 1 of the present invention showing the relationship between the rotation angle θ of the second lens cylinder T2 and the shifting distance x of the lens groups G1, G2, G4, and G5 driven by a motor M in a phototaking lens system 2 of FIG. 4.

FIG. 6 illustrates the relationship between the rotation angle θ of the second lens cylinder T2 and a shifting distance x of each of the lens groups in the optical axial direction regarding the zooming lens groups G1, G2, G4, and G5 driven by the motor M in the phototaking lens system 2 of Embodiment 1. As described, the second lens group G2 and the fourth lens group G4 move integrally, therefore, the relationship between the rotation angle θ of the second lens group G2 and the shifting distance x is not illustrated.

Figure 7:
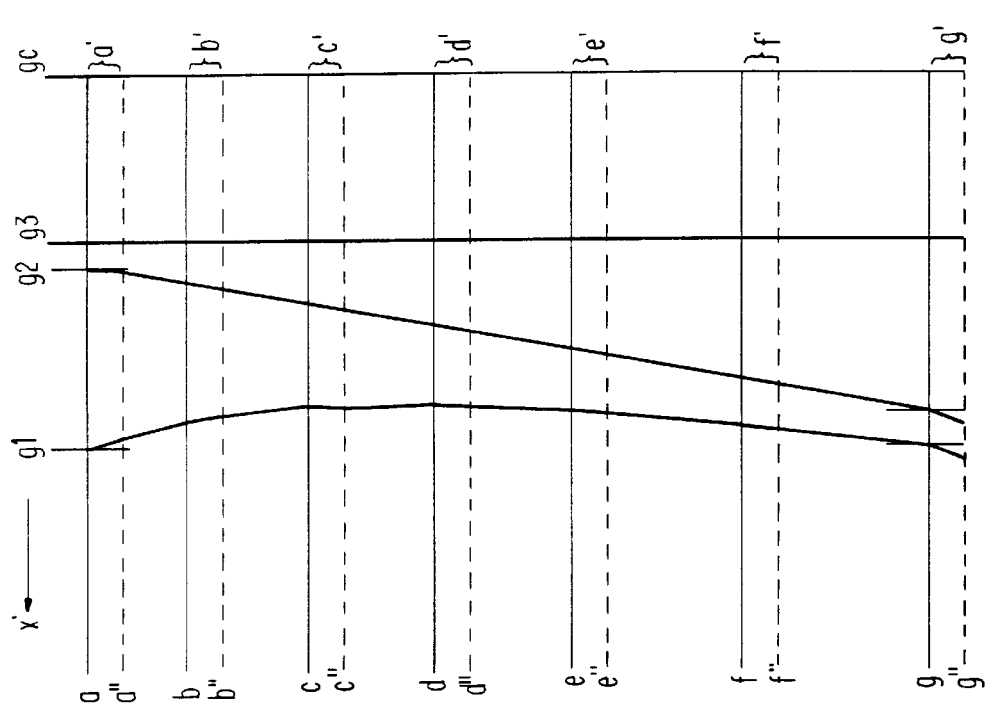
FIG. 7 is a zooming locus for Embodiment 1 showing the relationship between the rotation angle θ' of the zooming lever R and the shifting distance x' of the lens groups g1 and g2 driven by a motor M in the viewfinder lens system 101 of FIGS. 4 and 5.

FIG. 7 illustrates the relationship between the rotation angle θ' of the zooming lever R and the shifting distance x' of each of the lens groups in the optical axial direction regarding the zooming lens groups g1 and g2 driven by the motor M in the viewfinder lens system 101 of Embodiment 1. As illustrated in FIG. 7, the lens groups g3 and gc are fixed in the optical axial direction during zooming.

As illustrated in FIG. 6, in the phototaking lens system 2, for an infinitely far focal state, there are only seven lens position states, A through G, within the focal length range from the maximum wide-angle state to the maximum telephoto state. As such, the phototaking lens system 2 is of the step-zoom lens type. That is, the distance between each of the lens position states A (wide-angle end) through G (telephoto end) is predetermined. The range designated as A' through G' shows the shift orbit (cam orbit) of each of the lens groups during focusing at each of the lens position states A through G. In addition, A" through G" designates the position of each of the lens groups at the minimum objective distance state (1 m).

In each of the lens position states (each of the focal length states), when an object position moves from infinitely far to close range (1 m), each of the lens groups shifts from the A to A" state, B to B" state, C to C" state, D to D" state, E to E" state, F to F" state, and G to G" state. Note that in FIG. 6, the shift orbit for each of the lens groups is shown in broken lines. However, the cam orbit is actually smooth and continual. The differential value dx|dθ, where the shifting distance x is differentiated with respect to the rotation angle θ, is almost constantly changing.

As illustrated in FIG. 7, in the viewfinder lens system 101, assuming an infinitely far focal state, there are only seven lens position states, a through g, within the zooming range from the maximum wide-angle state to the maximum telephoto state. As such, the viewfinder lens system 101 is also of a step-zoom lens type. That is, the distance between each of the lens groups is predetermined at lens position states a (wide-angle end) through g (telephoto end). The range designated as a' through g' shows the shift orbit (cam orbit) of each of the lens groups during focusing at each of the lens position states a through g. In addition, a" through g" designates the position of each of the lens groups at the minimum objective distance state (1 m).

In each of the lens position states (each focal length state), when an object position moves from infinitely far to close range (1 m), each of the lens groups shift from the a to a" state, b to b" state, c to c" state, d to d" state, e to e" state, f to f" state, and g to g" state. Note that in FIG. 7, the shift orbit for each of the lens groups is shown in broken lines. However, the cam orbit is actually smooth and continual. The differential value dx'|dθ' where the shifting distance x' and the rotation angle θ' is almost constantly changing.

As described, the phototaking lens system 2 and the viewfinder lens system 101 are integrally driven by one motor M. In addition, each of the lens position states A through G in the phototaking lens system 2 and each of the lens position states a through g in the viewfinder lens system 101 correspond to each other. Also, the phototaking lens system 2 and the viewfinder lens system 101 simultaneously focus on the same object.

The following Table 1 shows values of the phototaking lens system 2 of Embodiment 1. In Table 1 D1 designates the variable distance for zooming between the first lens group G1 and the second lens group G2; D2 designates the variable distance for zooming between the second lens G2 and the third lens group G3; D3 designates the variable distance for zooming between the third lens group G3 and the fourth lens group G4; and D4 designates the variable distance for zooming between the fourth lens group G4 and the fifth lens group G5; Bf designates a back focus; f designates the focal length of the overall phototaking lens system. The values of D1 through D4 are positive if the lenses are shifted in the direction in which light is going. θ designates the rotation angle of the second lens cylinder T2 from the lens position state A, the wide-angle end.

TABLE 1

Focal Length of Each Lens Group

| First lens group G1 | +90.42959 |
| Second lens group G2 | −23.58989 |
| Third lens group G3 | +37.44992 |
| Fourth lens group G4 | +37.60310 |
| Fifth lens group G5 | −28.19763 |

Variable Distance for Zooming in Each of the Lens Group Position States A Through G

|   | D1 | D2 | D3 | D4 | Bf | f | θ |
|---|---|---|---|---|---|---|---|
| A | 5.500 | 8.559 | 10.452 | 27.677 | 8.766 | 39.000 | 0.000 |
| B | 10.259 | 7.892 | 11.119 | 24.241 | 15.610 | 50.000 | 5.934 |
| C | 14.621 | 7.073 | 11.938 | 21.238 | 24.267 | 65.000 | 13.210 |
| D | 18.393 | 6.303 | 12.708 | 18.976 | 33.235 | 82.000 | 20.822 |
| E | 22.214 | 6.092 | 12.919 | 16.683 | 42.788 | 100.000 | 28.872 |
| F | 25.484 | 5.753 | 13.258 | 14.496 | 55.896 | 125.000 | 39.181 |
| G | 28.482 | 5.392 | 13.619 | 12.674 | 70.163 | 154.036 | 50.400 |

The following Table 2 shows values of the objective lens system 104 of the viewfinder lens system 101 in Embodiment 1. In Table 2, d1 designates the variable distance for zooming between the lens group g1 and the lens group g2; d2 designates the variable distance for zooming between the lens g2 and the lens group g3; d3 designates the variable distance for zooming between the lens group g3 and the lens group gc; Bf designates a back focus; f designates the focal length of the overall phototaking lens system. The values of d1 through d3 are positive if the lenses are shifted in the direction in which light is going. θ' designates a rotation angle of the zooming lever R from the lens position state a, the wide-angle end, which is equal to the rotation angle θ of the second lens cylinder T2 in each of the lens position states.

TABLE 2

Focal Length of Each Lens Group

| Lens group g1 | −17.34998 |
| Lens group g2 | +15.14997 |
| Lens group g3 | −37.94066 |
| Lens group gc | +26.05697 |

Variable Distance for Zooming in Each of the Lens Group Position States a Through g

|   | d1 | d2 | d3 | Bf | f | θ' |
|---|---|---|---|---|---|---|
| a | 27.417 | 3.913 | 25.451 | 8.473 | 11.989 | 0.000 |
| b | 21.039 | 6.039 | 25.451 | 8.473 | 15.279 | 5.934 |
| c | 15.789 | 8.922 | 25.451 | 8.473 | 19.738 | 13.210 |
| d | 12.139 | 12.170 | 25.451 | 8.473 | 24.762 | 20.822 |
| e | 9.614 | 15.591 | 25.451 | 8.473 | 30.054 | 28.872 |
| f | 7.302 | 20.318 | 25.451 | 8.473 | 37.368 | 39.181 |
| g | 5.550 | 25.781 | 25.451 | 8.473 | 45.818 | 50.400 |

In the phototaking lens system 2 of Embodiment 1, when focusing on an object at close range, the first lens group G1 through the fourth lens group G4 are integrally shifted to the object side; the fifth lens group G5 is shifted to the object side by a different shifting distance. In the following Table 3, Δ1 designates the shifting distance of the first lens group G1 within the range from the infinitely far objective state to the minimum objective distance state (1 m); Δ5 designates the shifting distance of the fifth lens group G5; r=Δ5|Δ1 designates the ratio for Δ5, the shifting distance of the fifth lens group G5, to Δ1, the shifting distance of the first lens group G1. The shifting distance values Δ1 through Δ5 are positive when the lenses are shifted toward an object. Note that in Table 3, Δθ designates the rotation angle of the second lens cylinder T2 in each of the lens position states A through G within the range from the infinitely far objective state to the minimum objective distance state. As shown in Table 3, the rotation angle Δθ is constant for each of the lens position states A through G in Embodiment 1.

TABLE 3

|   | r | Δ1 | Δ5 | Δθ |
|---|---|---|---|---|
| A | 1.4212 | 3.000 | 4.264 | 2.180 |
| B | 1.0173 | 3.000 | 3.052 | 2.180 |
| C | 0.7635 | 3.000 | 2.287 | 2.180 |
| D | 0.5992 | 3.000 | 1.797 | 2.180 |
| E | 0.4877 | 3.000 | 1.463 | 2.180 |
| F | 0.3799 | 3.000 | 1.140 | 2.180 |
| G | 0.2771 | 3.000 | 0.831 | 2.180 |

In the viewfinder lens system 101 of Embodiment 1, when focusing on an object at close range, the lens group g1 is shifted to the object side. The following Table 4 shows the shifting distance δ, the shifting distance of the lens group g1, and the range from an infinitely far objective state to the minimum objective distance state. Note that the value of the shifting distance Δ1 is positive when the lens group g1 is shifted to the object side. The rotation angle Δθ' of zooming lever R, the range from an infinitely far objective distance state to the minimum objective distance state, is equal to the rotation angle θ of the second lens cylinder T2. It is constant in each of the lens position states.

TABLE 4

|   | δ1 | Δθ' |
|---|---|---|
| a | 0.32 | 2.180 |
| b | 0.32 | 2.180 |
| c | 0.32 | 2.180 |
| d | 0.32 | 2.180 |
| e | 0.32 | 2.180 |
| f | 0.32 | 2.180 |
| g | 0.32 | 2.180 |

In the viewfinder lens system 101 in Embodiment 1, the lens group g1 closest to an object is shifted along the optical axis for focusing. The shifting distance is small for the focus lens group g1 during magnification. Therefore, the shifting distance for focus lens group g1 at each of the lens position states a through g can be constant.

As such, in Embodiment 1, one motor M can drive both the phototaking lens system 2 and the viewfinder lens system 101 to perform operations for zooming and focusing at the same time.

EMBODIMENT 2

Figure 8:
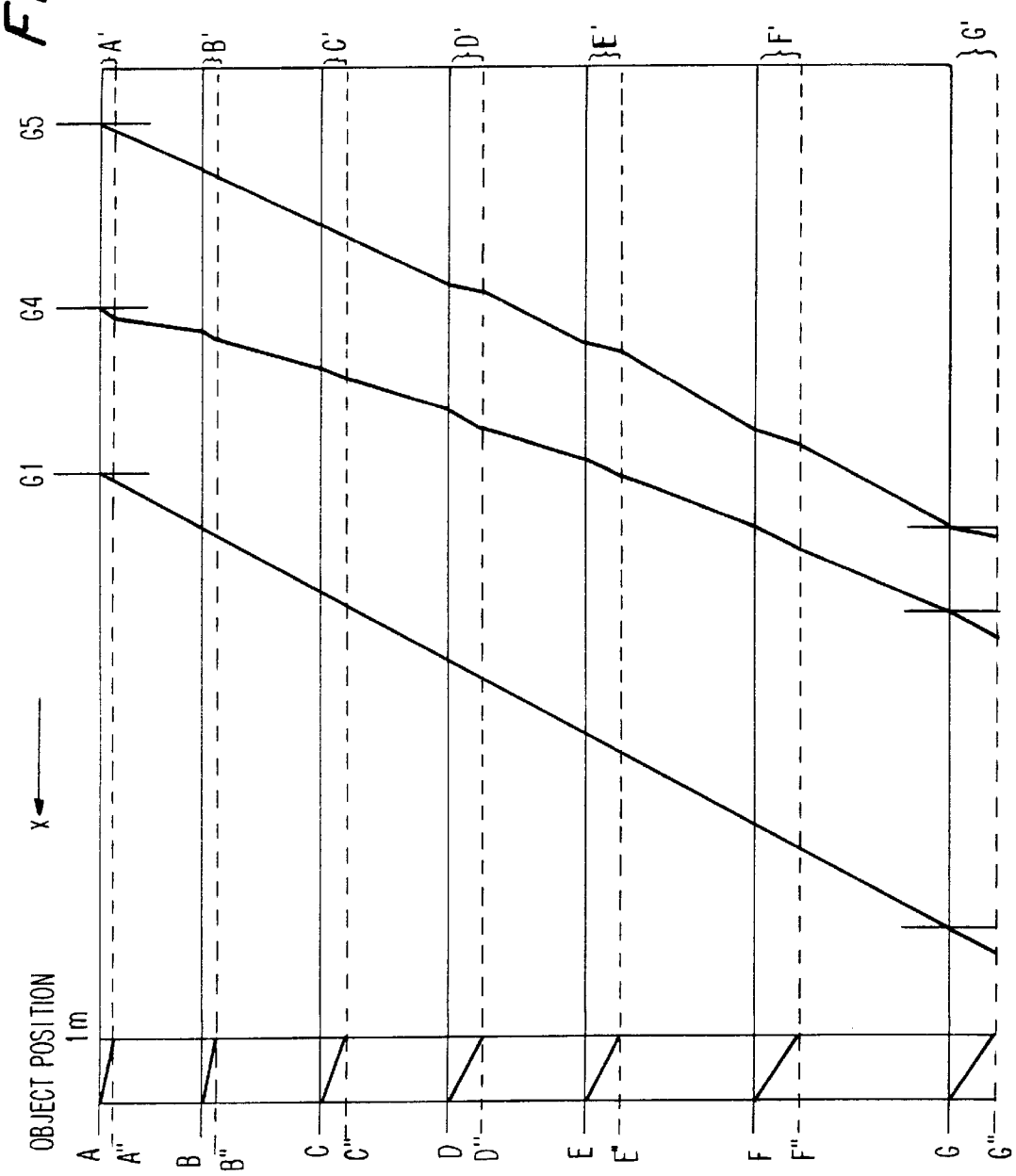
FIG. 8 is a zooming locus for Embodiment 2 showing the relationship between the rotation angle θ of the second lens cylinder T2 and the shifting distance x of the lens groups G1, G2, G4, and G5 driven by a motor M in the phototaking lens system 2 of FIG. 4.

FIG. 8 illustrates the relationship between the rotation angle θ of the second lens cylinder T2 and the shifting distance x of each of the lens groups in the optical axial direction regarding the zooming lens groups G1, G2, G4, and G5 driven by the motor M in the phototaking lens system 2 of Embodiment 2. Note that the second lens group G2 and the fourth lens group G4 move integrally. Therefore, the relationship between the rotation angle θ of the second lens group G2 and the shifting distance x is not shown.

Figure 9:
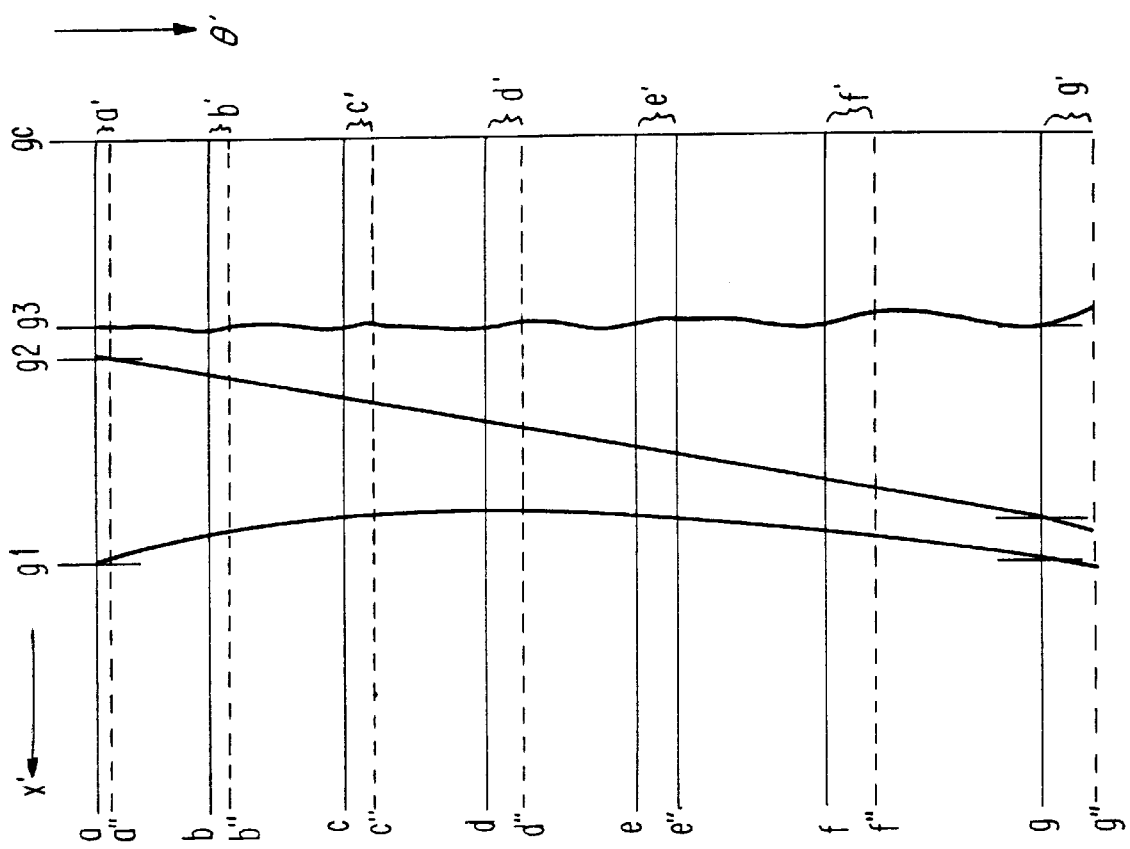
FIG. 9 is a zooming lens for Embodiment 2 showing the relationship between the rotation angle θ' of the zooming lever R and the shifting distance x' of the lens groups g1, g2, and g3 driven by a motor M in the viewfinder lens system 101 of FIGS. 4 and 5.

FIG. 9 illustrates the relationship between the rotation angle θ' of the zooming lever R and the shifting distance x' of each of the lens groups in the optical axial direction regarding the zooming lens groups g1, g2, and g3 driven by the motor M in the viewfinder lens system 101 of Embodiment 2. As illustrated in FIG. 9, the lens group gc is always fixed in the optical axial direction.

As illustrated in FIG. 8, in the phototaking lens system 2, for an infinitely far focal state, there are only seven lens position states, A through G, within the focal length range from the maximum wide-angle state to the maximum telephoto state. As such, the phototaking lens system 2 is of a step-zoom lens type. That is, the distance between each of the lens position states A (wide-angle end) through G (telephoto end) is predetermined. The range designated as A' through G' shows the shift orbit (cam orbit) of each of the lens groups during focusing at each of the lens position states A through G. In addition, A" through G" designates the position of each of the lens groups at the minimum objective distance state (1 m).

In each of the lens position states (each focal length state), when an object position moves from an infinitely far to a close range (1 m), each of the lens groups shift from the A to A" state, B to B" state, C to C" state, D to D" state, E to E" state, F to F" state, and G to G" state. Note that in FIG. 8, the shift orbit for each of the lens groups is shown in broken lines for simplicity. However, the cam orbit is actually smooth and continual. The differential value dx|dθ, where the shifting distance x is differentiated with respect to the rotation angle θ, is almost constantly changing.

As illustrated in FIG. 9, in the viewfinder lens system 101, for an infinitely far focal state, there are only seven lens position states, a through g, within the zooming range from the wide-angle end to the telephoto end. As such, the viewfinder lens system 101 also is of a step-zoom lens type. Therefore, the distance between each of the lens position states, a (wide-angle end) through g (telephoto end), is predetermined. The range designated as a' through g' shows the shift orbit (cam orbit) of each of the lens groups during focusing at each of the lens position states a through g. In addition, a" through g" designates the position of each of the lens groups at the minimum objective distance state (1 m).

In each of the lens position states (each focal length state), when an object position moves from an infinitely far to a close range (1 m), each of the lens groups shift from the a to a" state, b to b" state, c to c" state, d to d" state, e to e" state, f to f" state and g to g" state. Note that in FIG. 9, the shift orbit for each of the lens groups is shown in broken lines. However, the cam orbit is actually smooth and continual. The differential value dx'|dθ', where the shifting distance x' is differentiated with respect to the rotation angle θ', is almost constantly changing.

As described, the phototaking lens system 2 and the viewfinder lens system 101 are integrally driven by the same motor M. In addition, each of the lens position states A through G in the phototaking lens system 2 and each of the lens position states a through g in the viewfinder lens system 101 correspond to each other. Also, the phototaking lens system 2 and the viewfinder lens system 101 simultaneously focus on the same object.

The various values for the phototaking lens system 2 and the viewfinder lens system 101 in Embodiment 2 are the same as those in Embodiment 1, as shown in Table 1 and Table 2. Therefore, the various values for the phototaking lens system 2 and the viewfinder lens system 101 in Embodiment 2 are omitted.

In the phototaking lens system 2 of Embodiment 2, when focusing on an object at close range, the first lens group G1 through the fourth lens group G4 are integrally shifted to the object side; the fifth lens group G5 is shifted to the object side by a different shifting distance. In the following Table 5, Δ1 designates the shifting distance of the first lens group G1 within the range from the infinitely far objective state to the minimum objective distance state (1 m); r=Δ5|Δ1 designates the ratio for Δ5, the shifting distance of the fifth lens group G5, to Δ1, the shifting distance of the first lens group G1. The shifting distance values Δ1 through Δ5 are positive when the lenses are shifted toward an object. Note that in Table 5, Δθ designates the rotation angle of the second lens cylinder T2 in each of the lens position states A through G within the range from the infinitely far objective state to the minimum objective distance state. As shown in Table 5, the rotation angle Δθ is different for each of the lens position states A through G in Embodiment 2.

TABLE 5

|   | r    | Δ1     | Δ5     | Δθ    |
|---|------|--------|--------|-------|
| A | 0.50 | 1.2198 | 0.6099 | 0.884 |
| B | 0.50 | 1.6041 | 0.8020 | 1.165 |
| C | 0.50 | 2.0888 | 1.0444 | 1.518 |
| D | 0.50 | 2.6026 | 1.3013 | 1.891 |
| E | 0.50 | 3.0545 | 1.5272 | 2.219 |
| F | 0.50 | 3.5821 | 1.7910 | 2.602 |
| G | 0.50 | 4.1450 | 2.0725 | 3.011 |

In the viewfinder lens system 101 of Embodiment 2, when focusing on an object at close range, the third lens group g3 is shifted to the object side. In the following Table 6, δ3 designates the shifting distance of the first lens group g3 within the range from the infinitely far objective state to the minimum objective distance state. δ3, the shifting distance is positive when the lenses are shifted toward the image side. Note that Δθ', the rotation angle of the zooming lever R, equals the rotation angle θ of the second lens cylinder T2; the rotation angle Δθ' is different for each of the lens position states a through g.

TABLE 6

|   | δ3   | Δθ'   |
|---|------|-------|
| a | 0.11 | 0.884 |
| b | 0.18 | 1.165 |
| c | 0.30 | 1.518 |
| d | 0.48 | 1.891 |
| e | 0.71 | 2.219 |
| f | 1.11 | 2.602 |
| g | 1.70 | 3.011 |

As such, in Embodiment 2, one motor M can drive both the phototaking lens system 2 and the viewfinder lens system 101 to perform operations for zooming and focusing at the same time.

Note that when different aperture ratios are obtained at the wide-angle end and at the telephoto end in the phototaking lens system, different focus depths are obtained for each of the lens position states. When the rotation angles of the second lens cylinder T2 and the zooming lever R are maintained constant, independent from the lens position state, unfavorably precise control is provided at the wide-angle end of the lens position state rather than at the telephoto end. Therefore, the precision of controlling a rotation angle needs to be varied according to each of the lens position states, demanding a complex camera configuration.

For this reason, in Embodiment 2, selected as a focus lens group is a lens group whose shifting distance from an infinitely far objective state to the minimum objective distance state is larger at the maximum focal length state (telephoto end) than the minimum focal length state (wide-angle end). Therefore, in Embodiment 2, the control precision of the rotation angle is not very dependent on the lens position state, thus providing easy control of the focus lens group.

EMBODIMENT 3

Figure 10:
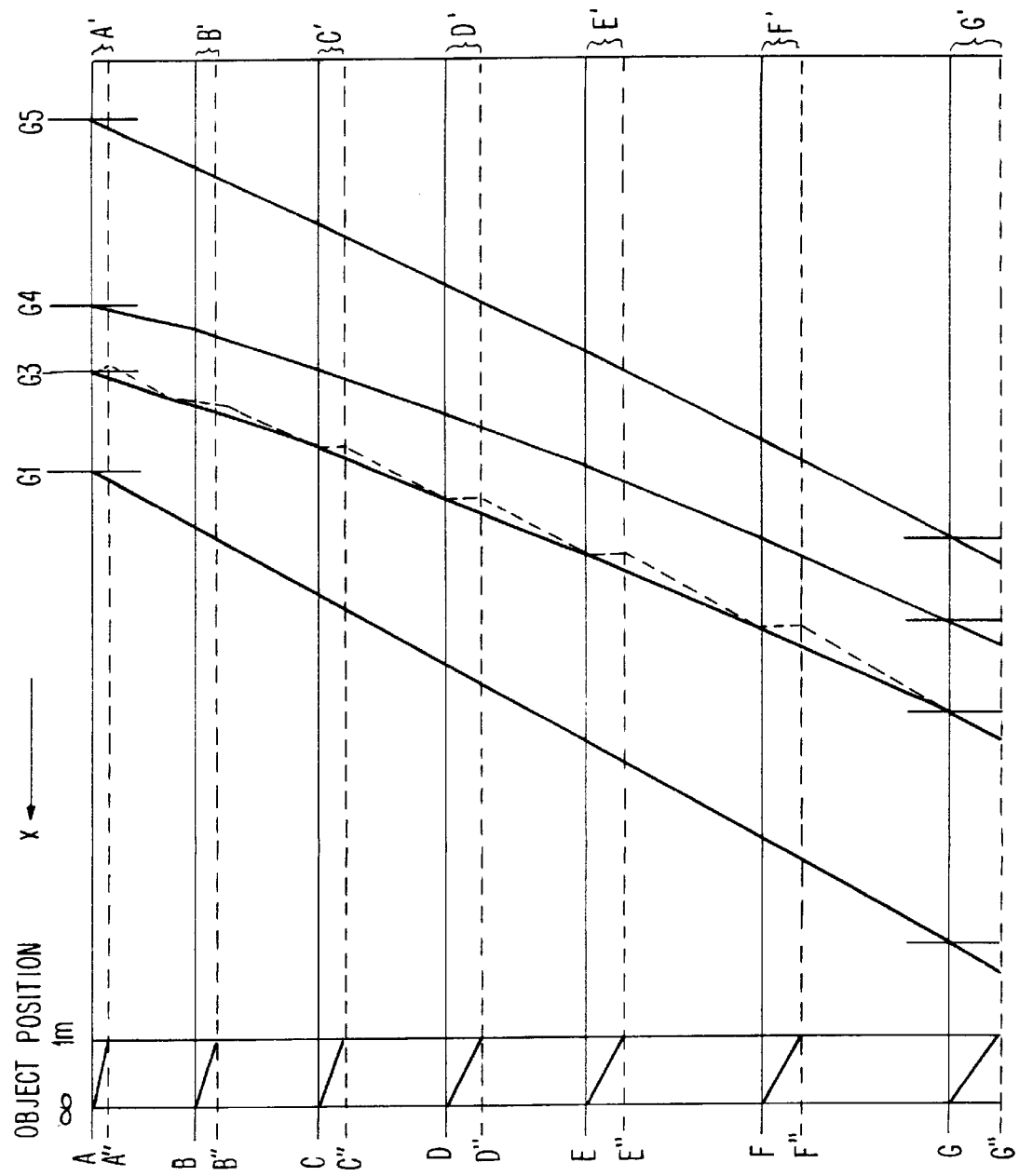
FIG. 10 is a zooming locus for Embodiment 3 showing the relationship between the rotation angle θ of the second lens cylinder T2 and the shifting distance x of the lens groups G1, G2, G3, G4, and G5 driven by a motor M in the phototaking lens system 2 of FIG. 4.

FIG. 10 illustrates the relationship between the rotation angle θ of the second lens cylinder T2 and the shifting distance x of each of the lens groups in the optical axial direction regarding the zooming lens groups G1 through G5 driven by the motor M in the phototaking lens system 2 in Embodiment 3. Note that the second lens group G2 and the fourth lens group G4 move integrally, therefore, the relationship between the rotation angle θ of the second lens group G2 and the shifting distance x is not shown.

Figure 11:
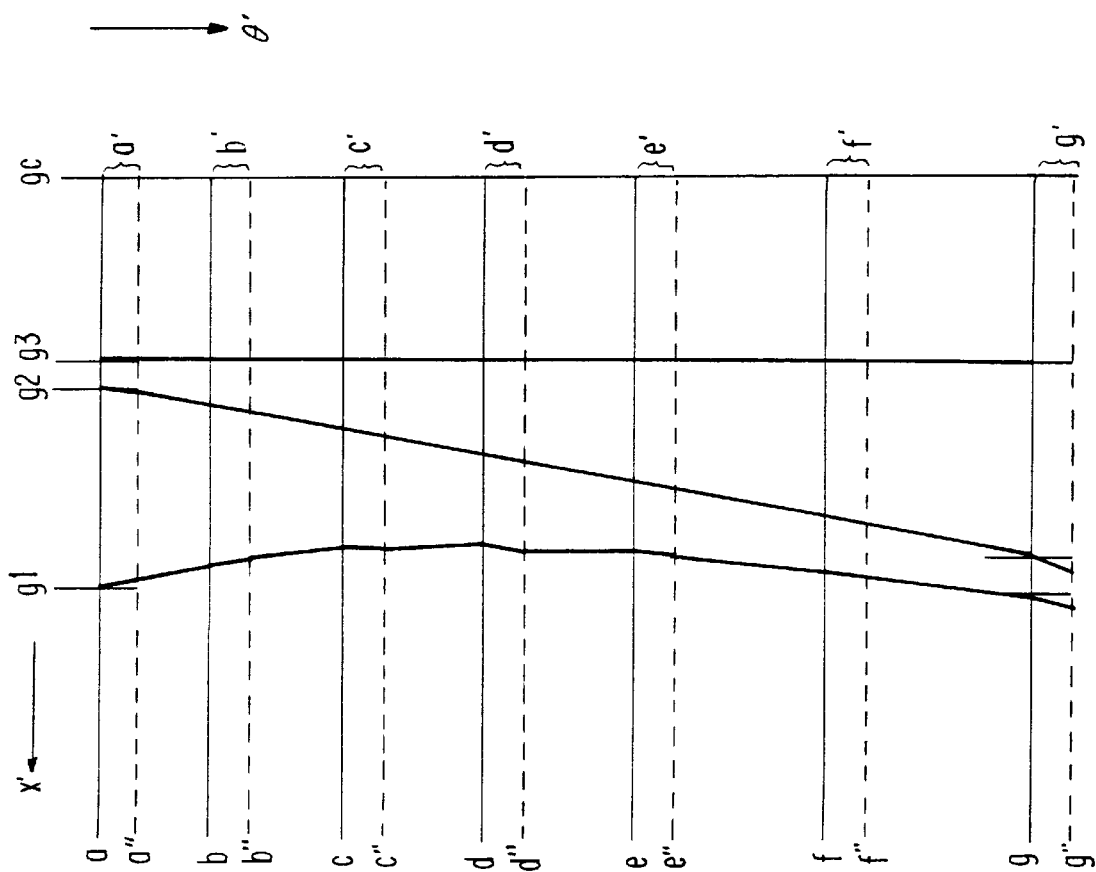
FIG. 11 is a zooming locus for Embodiment 3 showing the relationship between the rotation angle θ' of the zooming lever R and the shifting distance x' of the lens groups g1 and g2 driven by a motor M in the viewfinder lens system 101 of FIGS. 4 and 5.

FIG. 11 illustrates the relationship between the rotation angle θ' of the zooming lever R and the shifting distance x' of each of the lens groups in the optical axial direction regarding the zooming lens groups g1 and g2 driven by the motor M in the viewfinder lens system 101 in Embodiment 3. As illustrated in FIG. 11, the lens groups g3 and gc are always fixed in the optical axial direction.

As illustrated in FIG. 10, in a phototaking lens system 2, for an infinitely far focal state, there are only seven lens position states, A through G within the focal length range from the wide-angle end to the telephoto end. As such, the phototaking lens system 2 is of the step-zoom lens type. Therefore, the distance between each of the lens position states A (wide-angle end) through G (telephoto end) is predetermined. The range designated as A' through G' shows the shift orbit (cam orbit) of each of the lens groups during focusing at each of the lens position states A through G. In addition, A" through G" designates the position of each of the lens groups at the minimum objective distance state (1 m).

In each of the lens position states, when an object position moves from infinitely far to close range (1 m), each of the lens groups shifts from the A to A" state, B to B" state, C to C" state, D to D" state, E to E" state, F to F" state, and G to G" state. Note that in FIG. 10, the shift orbit for each of the lens groups is shown in broken lines. However, the cam orbit is actually smooth and continual. The differential value dx|dθ, where the shifting distance is x and the rotation angle is θ, is almost constantly changing.

As illustrated in FIG. 11, in the viewfinder lens system 101, for an infinitely far focal state, there are only seven lens position states, a through g, within the focal length range from the maximum wide-angle state to the maximum telephoto state. As such, the viewfinder lens system 101 is of the step-zoom lens type. Accordingly, the distance between each of the lens position states a (wide-angle end) through g (telephoto end) is predetermined. The range designated as a' through g' shows the shift orbit (cam orbit) of each of the lens groups during focusing at each of the lens position states a through g. In addition, a" through g" designates the position of each of the lens groups at the minimum objective distance state (1 m).

In each of the lens position states (each focal length state), when an object position moves from infinitely far to close range (1 m), each of the lens groups g1 and g2 shift from the a to a" state, b to b" state, c to c" state, d to d" state, e to e" state, f to f" state, and g to g" state. Note that in FIG. 11, the shift orbit for each of the lens groups are shown in broken lines. However, the cam orbit is actually smooth and continual. The differential value dx'|dθ', where the shifting distance is x' and the rotation angle is θ', is almost constantly changing.

As described, the phototaking lens system 2 and the viewfinder lens system 101 are integrally driven by the same motor M. In addition, each of the lens position states A through G in the phototaking lens system 2 and each of the lens position states a through g in the viewfinder lens system 101 correspond to each other. Also, the phototaking lens system 2 and the viewfinder lens system 101 simultaneously focus on the same object.

The various values for the phototaking lens system 2 and the viewfinder lens system 101 in Embodiment 3 remain the same as those in Embodiment 1, as illustrated in Table 1 and Table 2. Therefore, the various values for the phototaking lens system 2 and the viewfinder lens system 101 in Embodiment 3 are omitted.

In the phototaking lens system 2 of Embodiment 3, as described, the motor M shifts each of the lens groups G1 through G5 along the orbit shown by a solid line in the figure to focus on an object at an infinitely far range. On the other hand, when focusing on an object only the third lens group G3 is shifted along the orbit illustrated in broken lines using the drive lever K. The following Table 7 shows relative shifting distance Δ3 of the third lens group G3 with respect to the fourth lens group G4 within the range from an infinitely far objective state to the minimum objective distance state (1 m). The value of the relative shifting distance Δ3 is positive when the lenses are shifted toward an object. Δθ is the rotation angle of the second lens cylinder T2 within the range from an infinitely far objective state to the minimum objective distance state in each of the lens position states A through G. As shown in Table 7, the rotation angle Δθ is different for each of the lens position states A through G in Embodiment 3.

TABLE 7

|   | Δ3      | Δθ   |
|---|---------|------|
| A | −1.2198 | 2.44 |
| B | −1.9303 | 3.86 |
| C | −2.5490 | 5.10 |
| D | −3.0545 | 3.11 |
| E | −3.4851 | 6.97 |
| F | −3.8820 | 7.76 |
| G | −4.1450 | 8.29 |

In the viewfinder lens system 101 of Embodiment 3, when focusing on an object at close range, the first lens group g1 is shifted toward the object side. In the following Table 8, δ1 designates the shifting distance of the first lens group g1 within the range from the infinitely far objective state to the minimum objective distance state. The value of the shifting distance δ1 is positive when the lenses are shifted toward the object side.

TABLE 8

|   | δ1   | Δθ'  |
|---|------|------|
| a | 0.32 | 2.44 |
| b | 0.32 | 3.86 |
| c | 0.32 | 5.10 |
| d | 0.32 | 3.11 |
| e | 0.32 | 6.97 |
| f | 0.32 | 7.76 |
| g | 0.32 | 8.29 |

As such, in Embodiment 3, one motor M can drive both the phototaking lens system 2 and the viewfinder lens system 101 to perform operations for zooming and focusing at the same time.

In Embodiment 3, close range focusing is performed by shifting only the third lens group G3. Therefore, there is no need for the phototaking lens system 2 to be a step-zoom lens. When the phototaking lens system 2 is a step-zoom lens, for example, if each of the lenses are stopped and are slightly displaced from the lens position state B, the focal length is displaced to cause control errors, causing camera shaking. However, if the phototaking lens system 2 is configured with a zoom lens, control errors can be suppressed.

In each of the aforementioned embodiments, an infinitely far range is used for the basic length to focus on an object at an infinitely far range in each of the lens position states, in order to keep the description brief. However, a predetermined limited length can be used as a basic length to focus on an object in each of the lens position states.

Also, a real image type viewfinder lens system is more suitable for high zoom ratios. Each of the aforementioned embodiments shows examples using a real image type viewfinder lens system. However, the embodiments incorporating the principles of the present invention can be applied to the cameras using a virtual image type viewfinder lens system.

In Embodiment 2, a lens group gc is shifted in the optical axial direction during focusing through a viewfinder lens system, causing a slight fluctuation in eye exit. Therefore, when the shifting distance for an eye exit increases during focusing, it is desirable that the lens group gc be split into two lens groups to use the partial lens group arranged on the object side as a focus lens group.

As described above, the present invention can correct diopter displacement due to the change in the object position without complicating the viewfinder configuration.

Various modifications will become possible for those skilled in the art after receiving the teachings of the present disclosure without departing from the scope thereof.

What is claimed is:

1. In a camera having a phototaking lens system having a plurality of lens groups arranged along a first optical axis and a viewfinder lens system having a plurality of lens groups arranged along a second optical axis spaced from that of said phototaking lens system, a focusing apparatus comprising:

a driving device including a single motor for simultaneously driving predetermined lens groups of said phototaking lens system along said first optical axis and predetermined lens groups of said viewfinder lens system along said second optical axis when zooming said phototaking lens system; and means for coupling said single motor to said predetermined lens group of said phototaking lens system and to said predetermined lens group of said viewfinder lens system wherein when focusing on a close-range object, said driving device simultaneously guides said predetermined lens groups of said phototaking lens system along said first optical axis and said predetermined lens groups of said viewfinder lens system along said second optical axis in an arrangement such that the field angle of said phototaking lens system changes in conformity to the field angle of said viewfinder lens system to simultaneously focus the phototaking lens system and the viewfinder lens system on the same close range object.

2. Apparatus, as claimed in claim 1, wherein said coupling means includes a first guide means for converting torque generated by said single motor into the shifting distance of said predetermined lens groups of said phototaking lens system in the optical axial direction and a second guide means for converting torque generated by said single motor into the shifting distance of said predetermined lens groups of said viewfinder lens system.

3. Apparatus, as claimed in claim 2, wherein said phototaking lens system includes a plurality of basic focal length states focused on an object in the basic length in an orbit along said first guide means and is set in said plurality of basic focal length states when zooming.

4. Apparatus, as claimed in claim 3, wherein said torque of said motor for focusing the camera on an object at a predetermined distance from each of the basic focal length states in said photaking lens system and the torque of said motor for focusing on said object at said predetermined distance from each of the basic focal length states in the viewfinder lens system are the same.

5. Apparatus, as claimed in claim 3, wherein said basic length is infinitely far and said phototaking lens system and said viewfinder lens system provide focal states from an infinitely far focal state to a minimum focal state along said orbit extending in a predetermined direction from each of said basic focal length states to its adjacent basic focal state.

6. Apparatus, as claimed in claim 4, wherein said basic length is infinitely far and said phototaking lens system and said viewfinder lens system provide focal states from an infinitely far focal state to a minimum focal state along said orbit extending in a predetermined direction from each of said basic focal length states to its adjacent basic focal state.

7. Apparatus, as claimed in claim 4, wherein said basic length is infinitely far and said phototaking lens system and said viewfinder lens system provide focal states from an infinitely far focal state to a minimum focal state along said orbit extending in a predetermined direction from each of said basic focal length states to its adjacent basic focal state.

8. Apparatus for focusing a phototaking lens system and a viewfinder lens system of a camera on a close-range object, said phototaking lens system having a plurality of lens groups arranged along a first optical axis and said viewfinder lens system having a plurality of lens groups arranged along a second optical axis, spaced from said first axis, said apparatus comprising:

measuring means for measuring the distance from said camera to an object to provide object position data;

a first guiding means for shifting first predetermined lens groups of said phototaking lens system along said first optical axis;

a second guiding means for shifting second predetermined lens groups of said viewfinder lens system along said second optical axis; and driving means including a single motor for simultaneously shifting said first predetermined lens groups through said first guiding means and said second predetermined lens groups through said second guiding means when zooming and focusing, with said first and second guiding means being responsive to the output of the motor for shifting said first and second predetermined lens groups such that when said driving means sets said phototaking lens system to focus on an object based on said object position data, said viewfinder lens system is set to focus on said same object simultaneously.

9. A camera comprising:

a phototaking lens system having a plurality of movable lens groups;

a viewfinder lens system having a plurality of movable lens groups; and a single motor for driving a predetermined lens group of said phototaking lens system and a predetermined lens group of said viewfinder lens system;

means for coupling said single motor to said predetermined lens group of said phototaking lens system and to said predetermined lens group of said viewfinder lens system to perform simultaneous zooming and focusing functions in an arrangement such that the focal length of said phototaking lens is varied and the field angle of said viewfinder lens system is varied to substantially equal the field angle of said viewfinder of said phototaking lens system and that the focusing function is performed by the torque of said motor with the phototaking lens system and the viewfinder lens system simultaneously focused on the same close-range object.

10. A camera according to claim 9 comprising:

a measuring means for measuring the distance between said close-range object and an image plane of said phototaking lens system and outputting an object distance data;

wherein said focusing function is based on said object distance data.

11. A camera according to claim 7 wherein said coupling means comprises:

a first guide means for transforming the torque of said motor into driving said movable lens groups of said phototaking lens system; and a second guide means for transforming the torque of said motor into driving said movable lens groups of said viewfinder lens system.

* * * * *